United States Patent
Miyamori

(10) Patent No.: US 11,042,972 B2
(45) Date of Patent: Jun. 22, 2021

(54) IMAGE PROCESSING APPARATUS, AND NON-TRANSITORY COMPUTER READABLE MEDIUM FOR REDUCING UNDESIRABLE EFFECT DURING IMAGE CAPTURING

(71) Applicant: FUJIFILM Business Innovation Corp., Tokyo (JP)

(72) Inventor: Shinya Miyamori, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 54 days.

(21) Appl. No.: 16/286,620

(22) Filed: Feb. 27, 2019

(65) Prior Publication Data

US 2020/0098099 A1    Mar. 26, 2020

(30) Foreign Application Priority Data

Sep. 21, 2018 (JP) .............................. JP2018-177197

(51) Int. Cl.
  G06T 5/00 (2006.01)
  G06T 5/50 (2006.01)
  H04N 5/235 (2006.01)

(52) U.S. Cl.
  CPC ................ G06T 5/009 (2013.01); G06T 5/50 (2013.01); H04N 5/2354 (2013.01); *G06T 2207/10152* (2013.01); *G06T 2207/20208* (2013.01); *G06T 2207/20221* (2013.01)

(58) Field of Classification Search
  CPC . G06T 5/009; G06T 5/50; G06T 2207/10152; G06T 2207/20208; G06T 2207/20221; G06T 5/007; H04N 5/2354
  See application file for complete search history.

(56) References Cited

U.S. PATENT DOCUMENTS

| | | | |
|---|---|---|---|
| 2002/0150306 A1* | 10/2002 | Baron ................... | H04N 5/2354 382/275 |
| 2008/0049044 A1* | 2/2008 | Nitta ...................... | G03B 21/14 345/634 |
| 2008/0144898 A1* | 6/2008 | Hunt ................... | G06K 9/00127 382/128 |
| 2008/0278574 A1* | 11/2008 | Ramstad ............... | H04N 13/334 348/51 |
| 2009/0028461 A1* | 1/2009 | Wieringa ............. | A61B 5/0059 382/284 |

(Continued)

FOREIGN PATENT DOCUMENTS

JP       2010074693       4/2010

*Primary Examiner* — Ming Y Hon
(74) *Attorney, Agent, or Firm* — JCIPRNET

(57) ABSTRACT

An image processing apparatus includes a receiving unit that receives a first image that is captured with an object irradiated with light from a light irradiating unit and a second image that is captured with the object not irradiated with light from the light irradiating unit, and a generating unit that generates a composite image by adjusting brightness of a whole area of the second image such that brightness at a specific location in the first image is approximately equal to brightness at a corresponding specific location in the second image, and by replacing in the first image a pixel value of a pixel that is affected by light irradiation by the light irradiating unit with a pixel value of a pixel in the second image that has been adjusted in brightness.

19 Claims, 13 Drawing Sheets

(56) References Cited

U.S. PATENT DOCUMENTS

| | | | |
|---|---|---|---|
| 2010/0157079 A1* | 6/2010 | Atanassov | H04N 5/23232 348/222.1 |
| 2011/0122146 A1* | 5/2011 | Nie | G06T 5/40 345/589 |
| 2012/0062694 A1* | 3/2012 | Muramatsu | G06T 5/50 348/36 |
| 2013/0215290 A1* | 8/2013 | Solhusvik | H04N 5/35572 348/231.99 |
| 2015/0254505 A1* | 9/2015 | Sohgawa | B41F 33/0036 382/112 |
| 2015/0379698 A1* | 12/2015 | Kuramoto | H04N 1/6027 382/128 |
| 2018/0302571 A1* | 10/2018 | Kudo | H04N 5/332 |

* cited by examiner

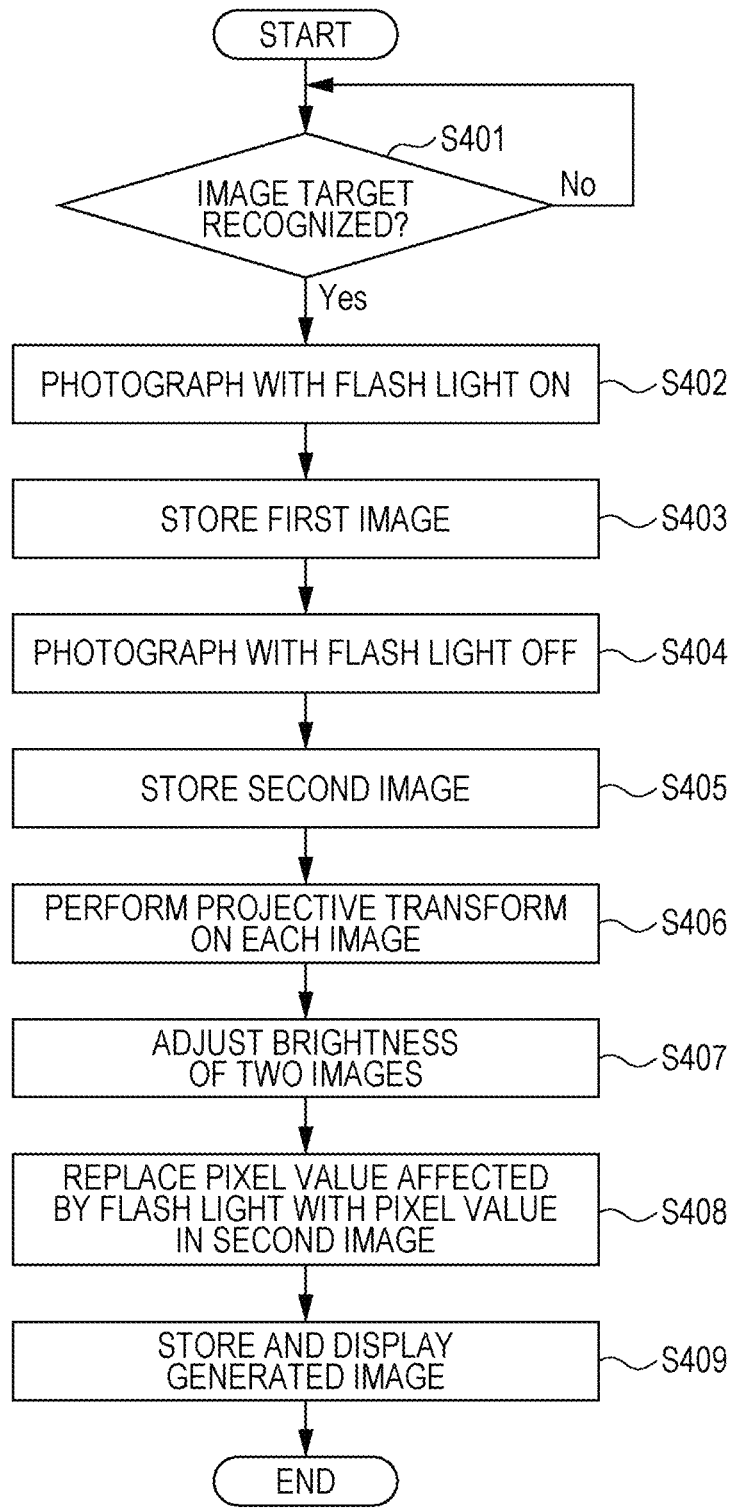

IMAGE PROCESSING APPARATUS, AND NON-TRANSITORY COMPUTER READABLE MEDIUM FOR REDUCING UNDESIRABLE EFFECT DURING IMAGE CAPTURING

CROSS-REFERENCE TO RELATED APPLICATIONS

This application is based on and claims priority under 35 USC 119 from Japanese Patent Application No. 2018-177197 filed Sep. 21, 2018.

BACKGROUND

(i) Technical Field

The present disclosure relates to an image processing apparatus, and a non-transitory computer readable medium.

(ii) Related Art

Japanese Unexamined Patent Application Publication No. 2010-74693 discloses a digital camera. The digital camera includes an electronic flash device that irradiates an object with flash light, an imaging device that consecutively acquires a first image that is captured with the object not irradiated with flash light, and a second image that is captured with the object irradiated with flash light, an image correlation detection circuit that detects an image portion of each image having no correlation by comparing the first image with the second image, and a correction image generating circuit that generates a third image by extracting from the second image the image portion having no correlation, removes from the first image the image portion having no correlation, and embedding the image portion extracted from the second image into the corresponding portion of the first image from which the image portion having no correlation has been removed.

SUMMARY

Aspects of non-limiting embodiments of the present disclosure relate to an image processing apparatus and a non-transitory computer readable medium. The image processing apparatus acquires an image that is captured in a more reduced effect that is caused with a light irradiating unit irradiating an object with light in comparison with an image of the object that is captured with the light irradiation unit irradiating the object with light at one time only.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus. The image processing apparatus includes a receiving unit that receives a first image that is captured with an object irradiated with light from a light irradiating unit and a second image that is captured with the object not irradiated with light from the light irradiating unit, and a generating unit that generates a composite image by adjusting brightness of a whole area of the second image such that brightness at a specific location in the first image is approximately equal to brightness at a corresponding specific location in the second image, and by replacing in the first image a pixel value of a pixel that is affected by light irradiation by the light irradiating unit with a pixel value of a pixel in the second image that has been adjusted in brightness.

BRIEF DESCRIPTION OF THE DRAWINGS

Exemplary embodiments of the present disclosure will be described in detail based on the following figures, wherein:

FIG. 6 is a flowchart illustrating an image composing process performed by the image processing apparatus of the exemplary embodiment;

FIGS. 8A through 8C illustrate the concept of the image composing process of the exemplary embodiment, wherein FIG. 8A illustrates luminance of a pixel row of the first image of FIG. 7A across line VIIIA-VIIIA, FIG. 8B illustrates luminance of pixel rows of the first and second images with brightness of the second image adjusted, and FIG. 8C illustrates luminance of a pixel row of a composite image into which the first and second images are combined;

FIGS. 11A and 11B illustrate the configuration of an image processing server of the image processing system of the modification of the exemplary embodiment, wherein FIG. 11A illustrates the hardware configuration of the image processing server, and FIG. 11B illustrates the functional block diagram of the image processing server;

DETAILED DESCRIPTION

Figure 1A:
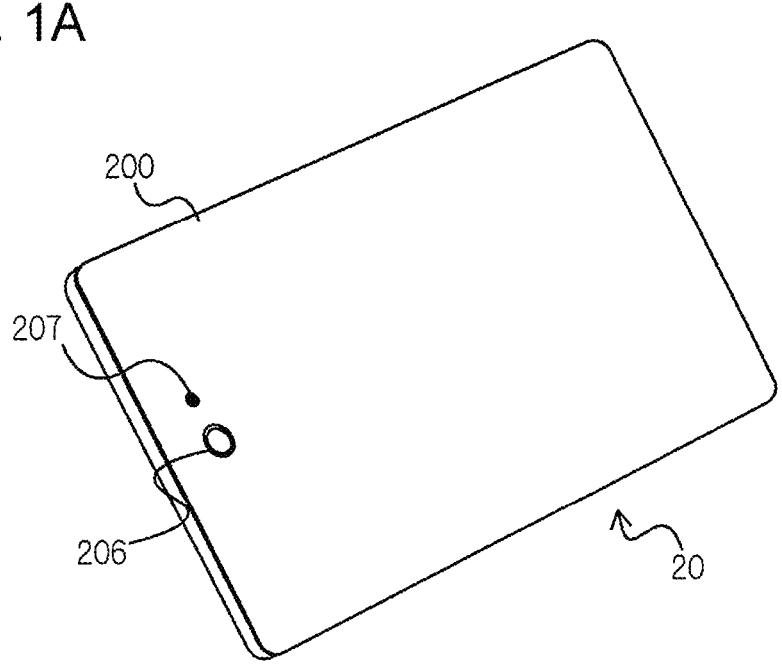
FIG. 1A a perspective external view of an image processing apparatus of an exemplary embodiment.
Figure 1B:
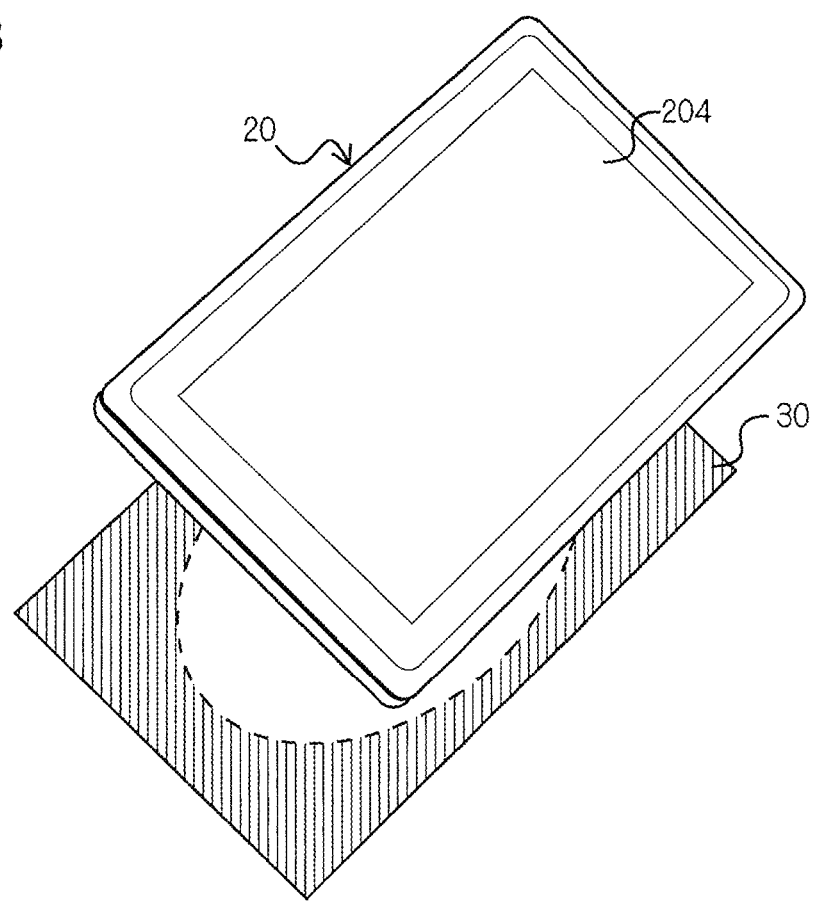
FIG. 1B is a perspective view illustrating how an object is photographed using the image processing apparatus.

An image processing apparatus 20 of an exemplary embodiment of the disclosure is described with reference to FIGS. 1A and 1B. FIG. 1A is a perspective external view of the image processing apparatus 20 of the exemplary embodiment, and FIG. 1B is a perspective view illustrating how an object 30 is photographed using the image processing apparatus 20. Referring to FIGS. 1A and 1B, the image processing apparatus 20 of the exemplary embodiment is a tablet computer. The disclosure is not limited to the tablet computer. For example, the image processing apparatus 20 may be a smart phone or a digital camera as long as the configuration thereof is the one described below. The image processing apparatus 20 may be a terminal device, such as a notebook computer with a camera. A housing 200 of the image processing apparatus 20 includes on the rear surface thereof a camera 206, and a flash generating device 207. The housing 200 of the image processing apparatus 20 includes on the front surface thereof a display 204 that occupies most of the front surface.

As described below, when the object 30 is photographed, the video of the object 30 captured by the camera 206 is displayed on the display 204 on a real-time basis. A user may photograph the object 30 by operating an input interface (described below) mounted on the display 204 while observing the object 30 displayed on the display 204.

In accordance with the exemplary embodiment, the object 30 may be a test image of a printer or a multi-function apparatus, output by an image forming apparatus. The test image is an image printed on an entire paper sheet with one or a mixture of black, cyan, magenta, and yellow colors at a given density, or may be an entire half-tone image. The test image is used to check the presence or absence of nonuniformity or banding when image data at a specific gradation value is printed out. The object that is photographed in accordance with the exemplary embodiment of the disclosure is not limited to the test image. The object 30 may be a different image.

Figure 2:
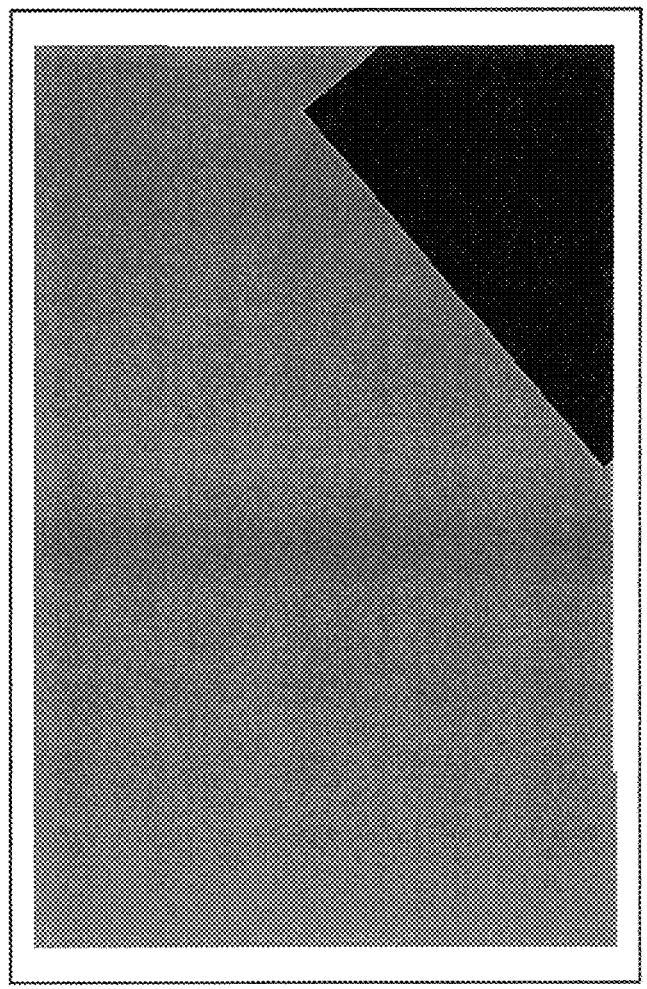
FIG. 2 illustrates the state of the object that is photographed with the object not irradiated with light from a flashing device.

If an entire image filled with the same color (solid image) is photographed as an object by the image processing apparatus 20 with the object not irradiated with light from the flash generating device 207, a shadow may be created on the object 30 by light incoming from the outside as illustrated in FIG. 2. For example, nonuniformity of light reflected from the object 30, such as luminance nonuniformity, may be caused by the shadow of the image processing apparatus 20 itself or the shadow of a hand of a photographer.

Figure 3:
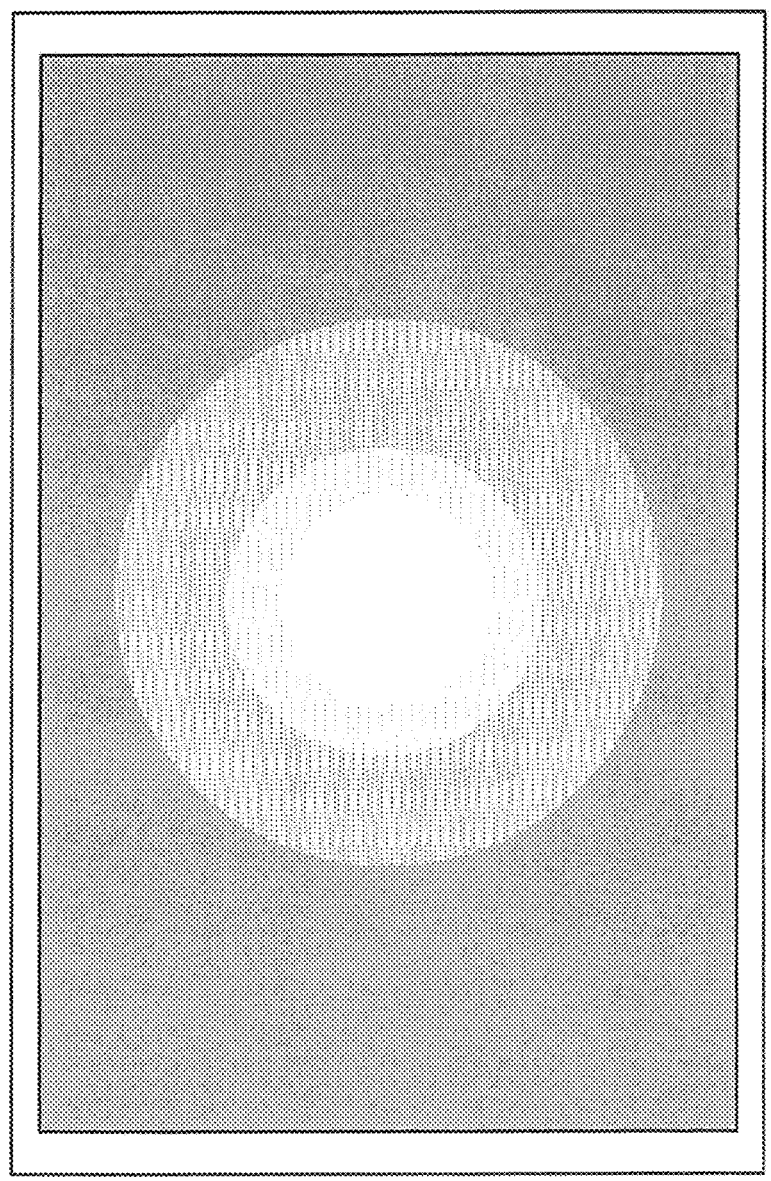
FIG. 3 illustrates the state of the object that is photographed with the object irradiated with light from the flashing device.

The object 30 may be photographed within close distance with the flash generating device 207 irradiating the object 30 with light in order to capture an image that is free from the effect of the shadow caused by light incoming from the outside. Referring to FIG. 3, concentric gradations about the center where light is projected appear on the object 30. If such a problem occurs, it is difficult to check the presence or absence of nonuniformity or the presence or absence of banding when the image data at a fixed gradation value is printed out. It is desirable to reduce an effect involved in image capturing.

The effect caused by the flash generating device 207 radiating light is desirably reduced in the image captured by the image processing apparatus 20 of the exemplary embodiment. The image is thus captured in a manner described below.

Figure 4:
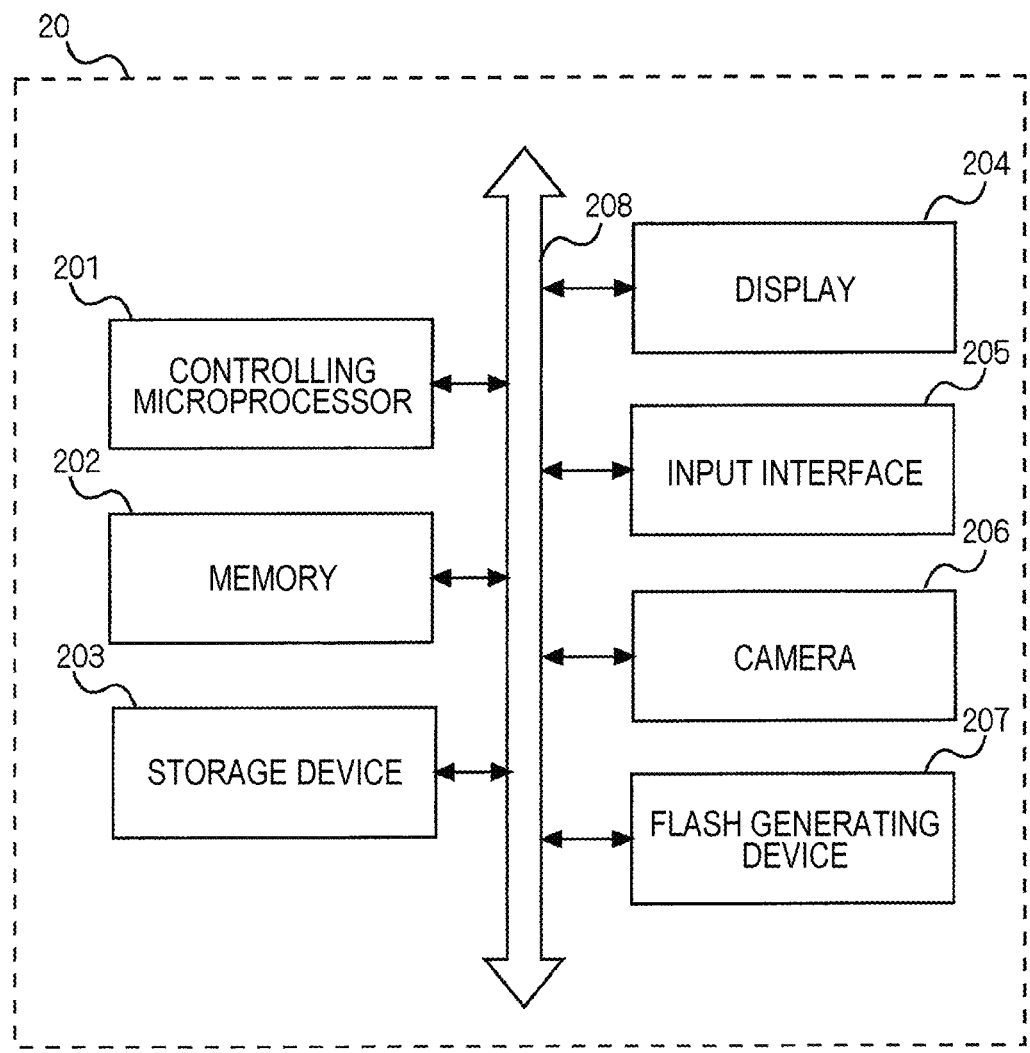
FIG. 4 illustrates a hardware configuration of the image processing apparatus of the exemplary embodiment.

The configuration of the image processing apparatus 20 of the exemplary embodiment is described with reference to FIG. 4. FIG. 4 illustrates the hardware configuration of the image processing apparatus 20 of the exemplary embodiment.

Referring to FIG. 4, the image processing apparatus 20 includes a controlling microprocessor 201, a memory 202, a storage device 203, a display 204, an input interface 205, a camera 206, and a flash generating device 207. Each of these elements is connected to control bus 208.

The controlling microprocessor 201 controls the operation of each element in the image processing apparatus 20 in accordance with a control program stored on the storage device 203.

An image of the object 30 photographed by the camera 206 and a composite image generated by an image generating unit are temporarily stored on the memory 202.

The storage device 203 includes a solid-state drive (SSD) or a hard disk (HDD), and stores a control program that controls each element in the image processing apparatus 20.

The display 204 includes a liquid-crystal display or an organic electroluminescent (EL) display, mounted on the housing 200 of the image processing apparatus 20, and displays information processed by a display controller described below.

The input interface 205 is a touch panel overlaid on the front surface of the display 204, and serves as an input unit on which a user operating the image processing apparatus 20 inputs instructions.

The camera 206 is arranged on the rear surface of the housing 200 of the image processing apparatus 20. The camera 206 captures the image of the object 30 in response to an instruction that the user inputs by operating the input interface 205, and an instruction from a camera controller described below. The captured image is stored on the memory 202.

The flash generating device 207 includes a light-emitting diode (LED) light. The flash generating device 207 serves as a light irradiation unit that irradiates the object 30 with flash light when the object 30 is photographed in response to the instruction from the camera controller.

Figure 5:
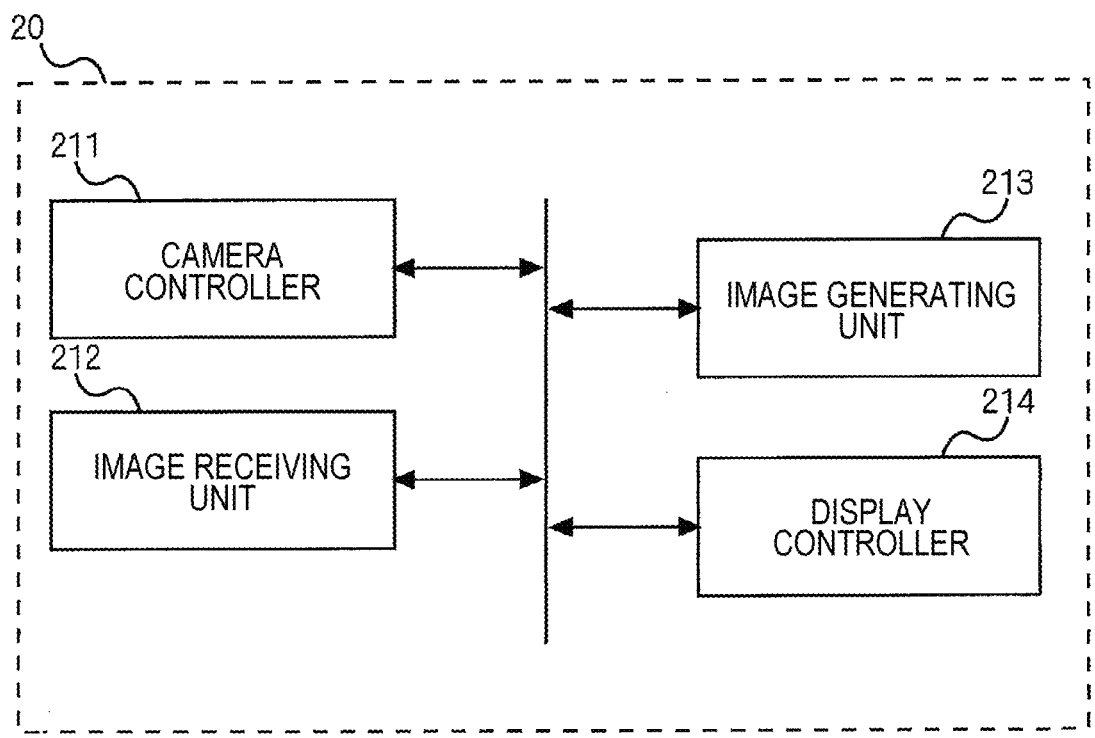
FIG. 5 is a functional block diagram of the image processing apparatus of FIG. 4.

The functionality of the image processing apparatus 20 of the exemplary embodiment is described with reference to FIG. 5. FIG. 5 is a functional block diagram illustrating the image processing apparatus 20 of FIG. 4. Referring to FIG. 5, the image processing apparatus 20 performs the functionalities of a camera controller 211, an image receiving unit 212, an image generating unit 213, and a display controller 214 when the controlling microprocessor 201 executes the control program stored on the storage device 203.

The camera controller 211 controls the operations of the camera 206 and the flash generating device 207. If the object 30 in the video captured by the camera 206 satisfies a specific condition, for example, if the object 30 is recognized in a predetermined size, the camera controller 211 adjusts focus. The camera controller 211 captures a first image by causing the flash generating device 207 to irradiate the object 30 with flash light, and immediately in succession to the capturing of the first image, captures a second image by not causing the flash generating device 207 to irradiate the object 30 with flash light, and stores the first and second images on the memory 202.

The image receiving unit 212 receives the first image that has been captured with the flash generating device 207 irradiating the object 30 with flash light and the second image that has been captured with the flash generating device 207 not irradiating the object 30 with flash light. In other words, the image receiving unit 212 retrieves the first image and the second image from the memory 202.

The image generating unit 213 performs projective transformation such that the first and second images retrieved by the image receiving unit 212 are corrected to be in a specified size. More specifically, when the object 30 is photographed by the camera 206 in the image processing apparatus 20, the image of the object 30 is captured at a slight slant angle. By performing the projective transformation on the captured images, distortion is removed from the images and the images are adjusted in size.

The image generating unit 213 adjusts brightness of the whole second image such that brightness at a specific location in the first image retrieved and projective-transformed by the image receiving unit 212 is approximately equal to brightness at a specific location in the second image retrieved and projective-transformed by the image receiving unit 212. The image generating unit 213 generates a composite image by replacing a pixel value of a pixel that has been affected by the irradiation of flash light from the flash generating device 207 with a pixel value of a pixel in the brightness-adjusted second image.

More specifically, the image generating unit 213 generates the composite image by replacing in the first image a pixel value of a pixel higher in brightness than a pixel in the second image adjusted in brightness, as a pixel that has been affected by the flash light irradiation by the flash generating device 207, with the pixel value of the pixel in the second image adjusted in brightness. Alternatively, the image generating unit 213 generates the composite image by selecting a pixel value of the first image retrieved by the image receiving unit 212 or a pixel value of the second image retrieved by the image receiving unit 212, whichever is lower.

The display controller 214 processes an image to be displayed on the display 204. The display controller 214 performs control to display on the display 204 a video that is captured by the camera 206 when an object is photographed by the camera 206, to display on the display 204 an image generated by the image generating unit 213, or to display on the display 204 a user interface (UI) that allows a user to input a variety of instructions.

Figure 7A:
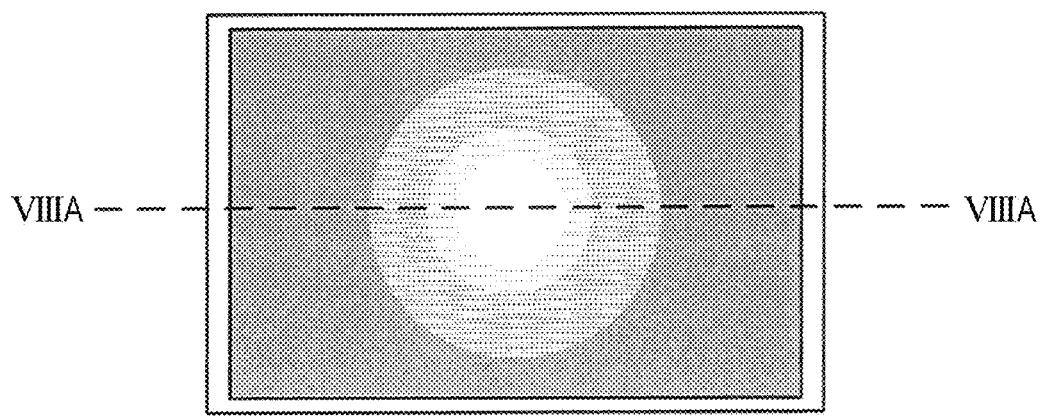
FIG. 7A illustrates the state of a first image that is obtained by capturing an image of the object with the object irradiated with flash light and then by projective-transforming the image.
Figure 7B:
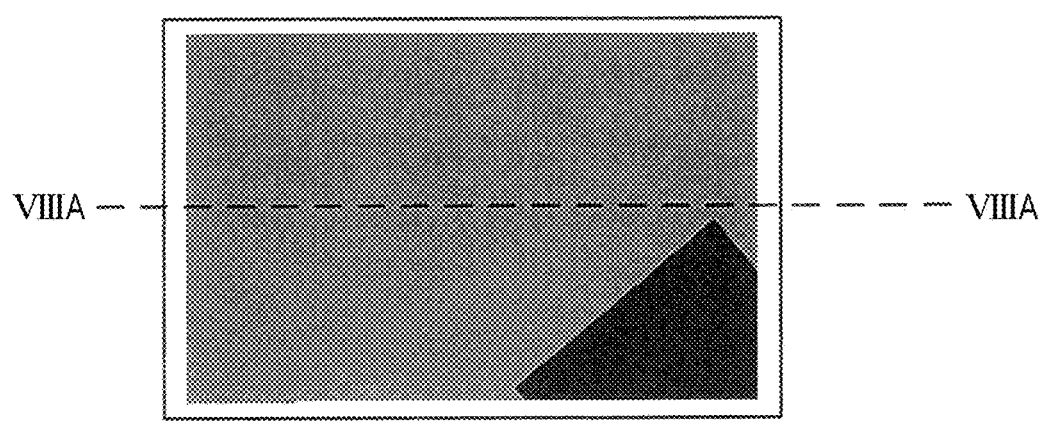
FIG. 7B illustrates the state of a second image that is obtained by capturing an image of the object with the object not irradiated with the flash light and then by projective-transforming the image.
Figure 8A:
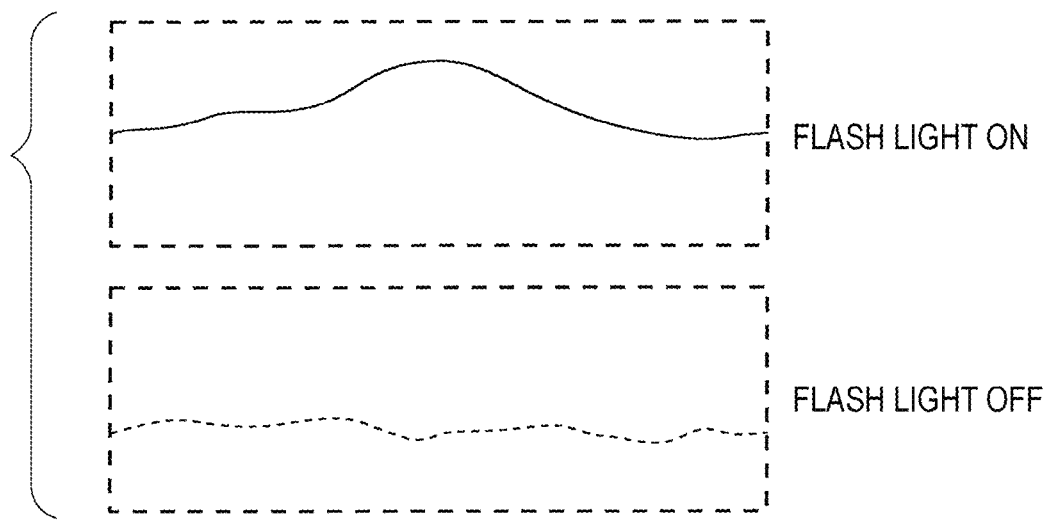
Figure 8B:
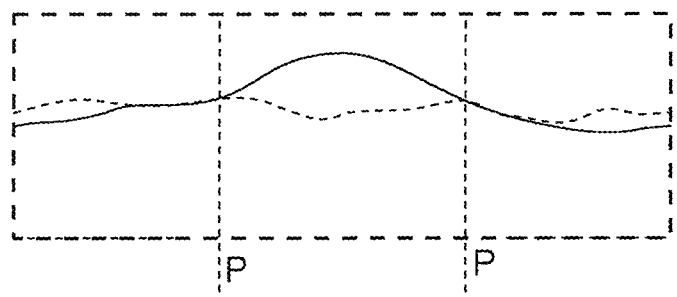
Figure 8C:
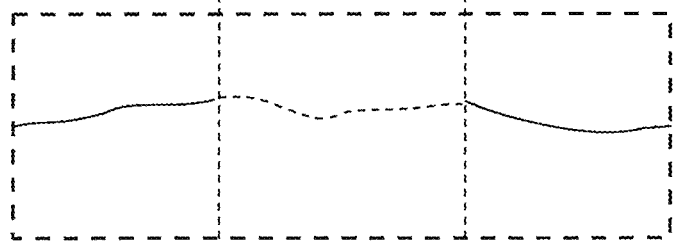

The image processing apparatus 20 of the exemplary embodiment is described with reference to FIGS. 6, 7A and 7B, and 8A through 8C. FIG. 6 is a flowchart illustrating an image composing process performed by the image processing apparatus 20 of the exemplary embodiment. FIGS. 7A and 7B illustrate images that have undergone projective transformation. Specifically, FIG. 7A illustrates the first image that is captured with the object irradiated with flash light, and FIG. 7B illustrates the second image that is captured with the object not irradiated with the flash light. FIGS. 8A through 8C illustrate the concept of the image composing process of the exemplary embodiment. FIG. 8A illustrates luminance of a pixel row of the image captured with the object irradiated with the flash light from the flash generating device 207 and luminance of a pixel row of the image captured with the object not irradiated with the flash light from the flash generating device 207. FIG. 8B illustrates the concept of corrected luminance. FIG. 8C illustrates luminance of the pixel row of the composite image.

In step S401, the camera controller 211 causes the camera 206 to start operating in response to an instruction from a user. The display controller 214 displays a video captured by the camera 206 on the display 204. The camera controller 211 determines whether the object 30 to be photographed is recognized as satisfying a predetermined condition. The condition is related to whether the object 30 is recognized as being in a predetermined size or larger. If the predetermined condition is not satisfied, an attempt to recognize the object 30 continues with the camera 206 inactive. If the object 30 that satisfies the predetermined condition is not recognized even after the time elapse of a predetermined period of time, the image composing process may end.

If the object 30 to be photographed is recognized as satisfying the predetermined condition, the process proceeds to step S402. The camera controller 211 causes the flash generating device 207 to irradiate the object 30 with flash light for image capturing.

In step S403, the camera controller 211 stores on the memory 202, as the first image, an image that is captured with the flash generating device 207 irradiating the object 30 with the flash light.

In step S404, the camera controller 211 immediately captures the image of the object 30 with the flash generating device 207 not irradiating the object 30 with the flash light.

In step S405, the camera controller 211 stores on the memory 202, as the second image, an image that is captured with the flash generating device 207 not irradiating the object 30 with the flash light.

In step S406, the image receiving unit 212 retrieves the first and second images from the memory 202. The image generating unit 213 projective-transforms each of the first and second images, and corrects the projective-transformed first and second images to be equal to each other in size. During the projective transformation, distortion in the first and second image is removed. The intended image size during the projective transformation is pre-set by the user. Alternatively, during the projective transformation, the display controller 214 may request the user to specify the image size, and the user may operate the input interface 205 to specify the image size to which the images have to be scaled.

In step S407, the image generating unit 213 adjusts the brightness of the whole second image such that brightness at specific locations in the first image projective-transformed may be approximately equal to brightness at specific locations in the second image projective-transformed. The specific locations are multiple locations off the central region of each of the first image and second images projective-transformed. For example, if four imaginary lines are drawn from the center of each of the first image and second images projective-transformed to the four corners thereof, the specific locations are four points, each point at one-third length point along each imaginary line from the center of each image. The specific locations may be other multiple points in the images. The specific locations are not limited to four points, and may be a different number of points.

The brightness may be any index indicating a luminance value, a gradation value, lightness, or a degree of brightness of an image. In the following discussion, the brightness is luminance. According to the exemplary embodiment, the image generating unit 213 adjusts the luminance value of the whole area of the second image that has been projective-transformed such that the mean of the luminance values at the four locations in the first image projective-transformed and the mean of the luminance values at the four locations in the second image projective-transformed are approximately equal to each other, specifically within a predetermined range, or more preferably converge to the same value. Besides the mean of the luminance values, a variance of luminance or contrast may be calculated, and the second image may be adjusted such that the variance falls within a predetermined range.

The operation in step S407 is described with reference to FIGS. 7A and 7B, and FIGS. 8A through 8C. FIG. 7A illustrates the state of the first image that is obtained by capturing the image of the object 30 with the object 30 irradiated with flash light and then by projective-transforming the image. FIG. 7B illustrates the state of the second image that is obtained by capturing an image of the object 30 with the object 30 not irradiated with flash light and then by projective-transforming the image. FIG. 8A illustrates luminance of the pixel row of the first image of FIG. 7A along line VIIIA-VIIIA and luminance of the pixel row of the second image of FIG. 7B along line VIIIA-VIIIA. FIG. 8B illustrates luminance of pixel rows of the first and second images with brightness of the second image adjusted, and FIG. 8C illustrates luminance of the pixel row of the composite image into which the first and second images are combined.

Referring to FIGS. 7A and 7B, and FIGS. 8A through 8C, the horizontal axis of FIGS. 8A through 8C illustrating the luminance of the pixel rows is an X coordinate when the image is cut in a horizontal direction, and the vertical axis represents luminance values. Referring to FIG. 8A, luminance of the image captured with the flash generating device 207 irradiating the object with the flash light is typically higher than luminance of the image captured with the flash generating device 207 not irradiating the object with the flash light. Furthermore, the plot of the luminance of the image captured with the flash generating device 207 irradiating the object with the flash light has a hill-like shape along the horizontal axis with the peak point thereof at the central region and the slopes on both sides. Referring to FIG. 8B, the image generating unit 213 adjusts the luminance of the whole second image projective-transformed such that luminance values at points P in the first and second images projective-transformed are equal to each other (in other words, luminance values are generally increased as illustrated in FIG. 8B).

In step S408 of FIG. 6, the image generating unit 213 replaces the pixel value of a pixel that is affected by the flash light radiated by the flash generating device 207 with the pixel value of a pixel in the second image that has been adjusted in step S407. More specifically, the image generating unit 213 replaces the pixel value of a pixel brighter in the first image than in the second image that has been adjusted in brightness, as a pixel that has been affected by the flash light irradiated by the flash generating device 207, with a pixel value of a pixel in the second image that has been adjusted in brightness. Alternatively, the image generating unit 213 generates a composite image by comparing the projective-transformed first image with the bright-adjusted second image on a per pixel basis, and selecting a pixel value, whichever is less bright.

FIG. 8C illustrates the composite image as the resulting state. Within a range defined by specific points P, pixels in the second image adjusted in brightness are used as pixels in the composite image of FIG. 8C. Outside the range defined by the specific points P, the pixels in the first image projective-transformed are used as pixels in the composite image of FIG. 8C.

In step S409 of FIG. 6, the image generating unit 213 stores the composite image generated in step S408 on the memory 202. The display controller 214 displays the composite image on the display 204 such that the user may observe the composite image. The image composing process then ends.

In the image composing process described above, in the first image projective-transformed, the pixels brighter than those in the second image adjusted in brightness are determined to be the pixels that are affected by the flash light radiated by the flash generating device 207, and the pixel values of those pixels are thus replaced with the pixel values in the second image adjusted in brightness. The disclosure is not limited to the process. The pixel values of pixels in a region serving as a target to be replaced and of pixels surrounding the region are replaced with values that are calculated using pixel values in the first image projective-transformed and pixel values in the second pixel adjusted in brightness. In such a case, the pixel value of the pixel serving as a replacement may be obtained by combining, using SoftMinimum function, a pixel value in the first image projective-transformed and a pixel value in the second image adjusted in brightness.

According to the exemplary embodiment described above, the second image is captured with the object not irradiated with the flash light immediately after the first image is captured with the object irradiated with the flash light. Conversely, the first image may be captured with the object irradiated with the flash light immediately after the second image is captured with the object not irradiated with the flash light.

Figure 9:
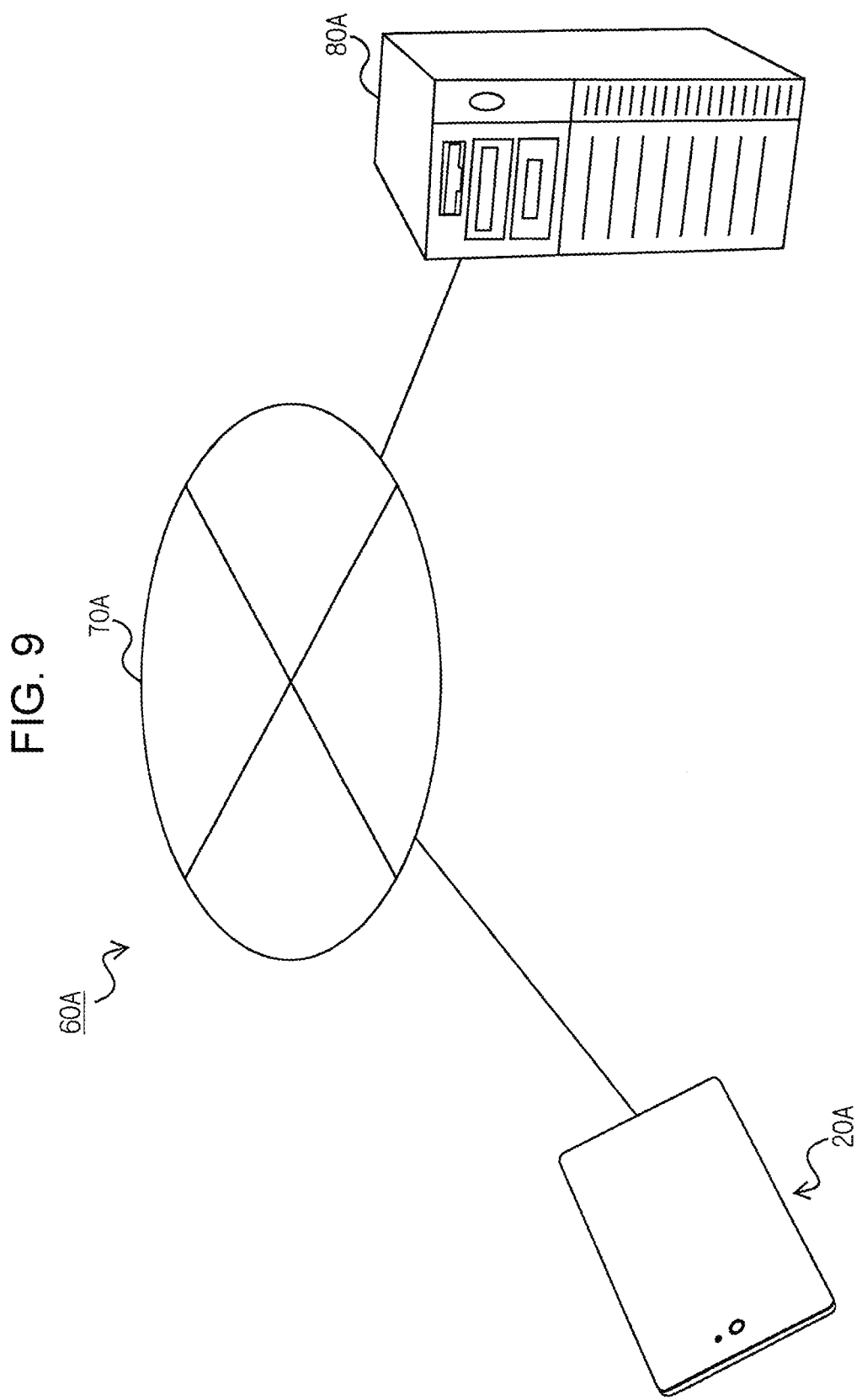
FIG. 9 illustrates the concept of an image processing system of a modification of the exemplary embodiment of the disclosure.
Figure 10:
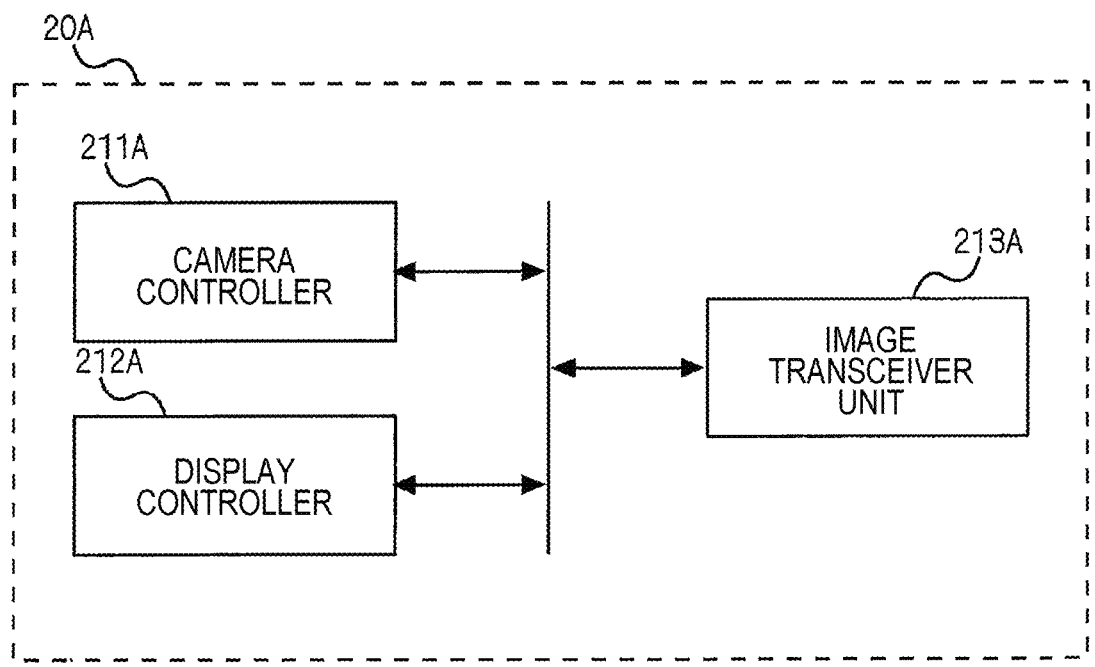
FIG. 10 is a functional block diagram illustrating a terminal device of the modification of the exemplary embodiment.
Figure 11A:
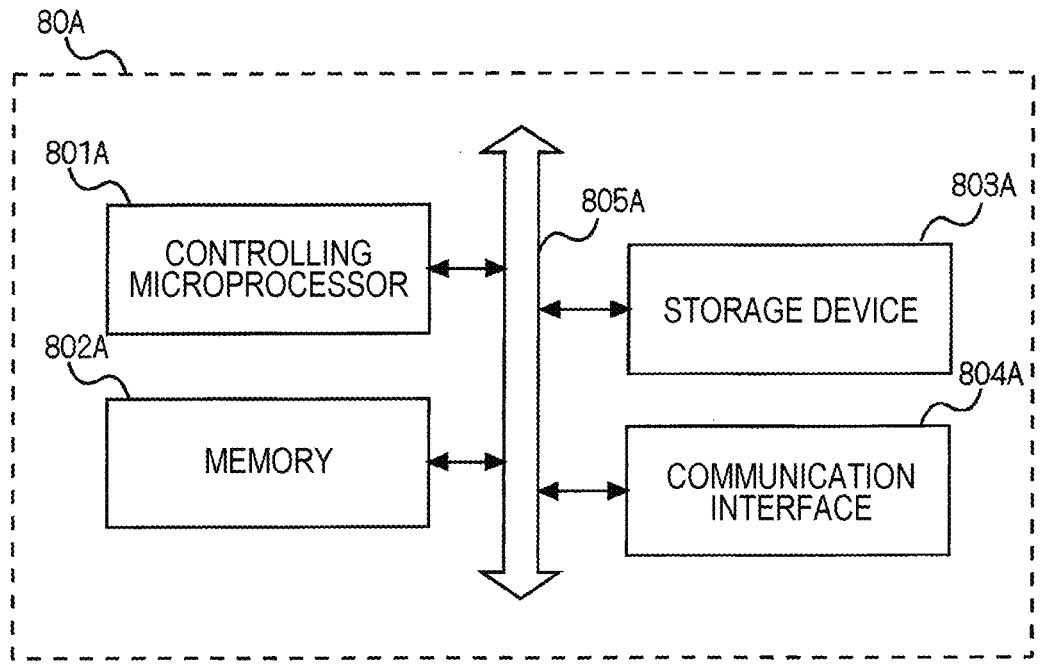
Figure 11B:
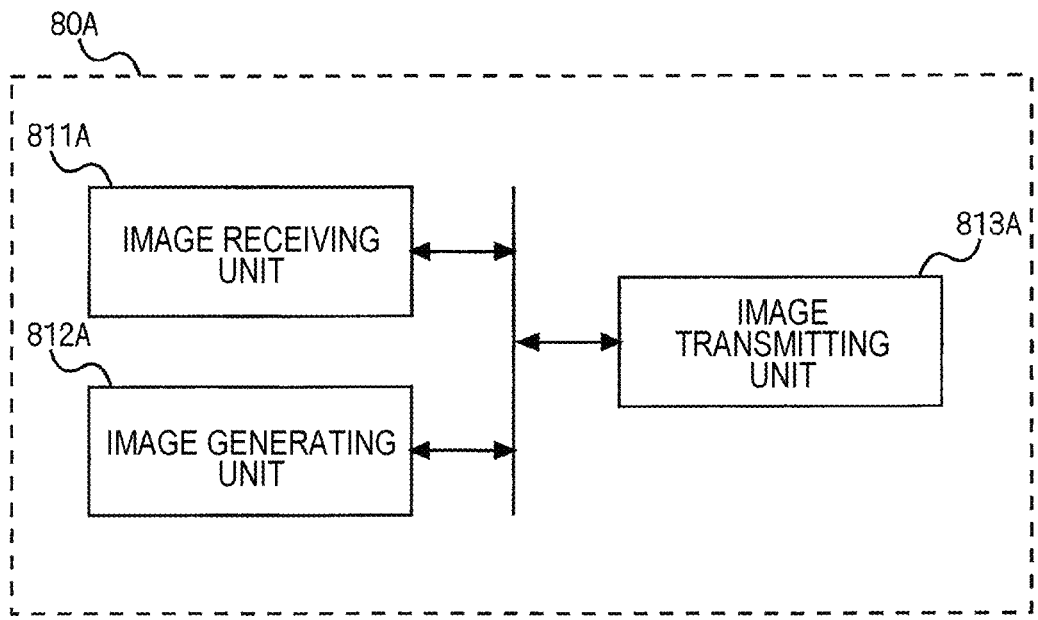
Figure 12:
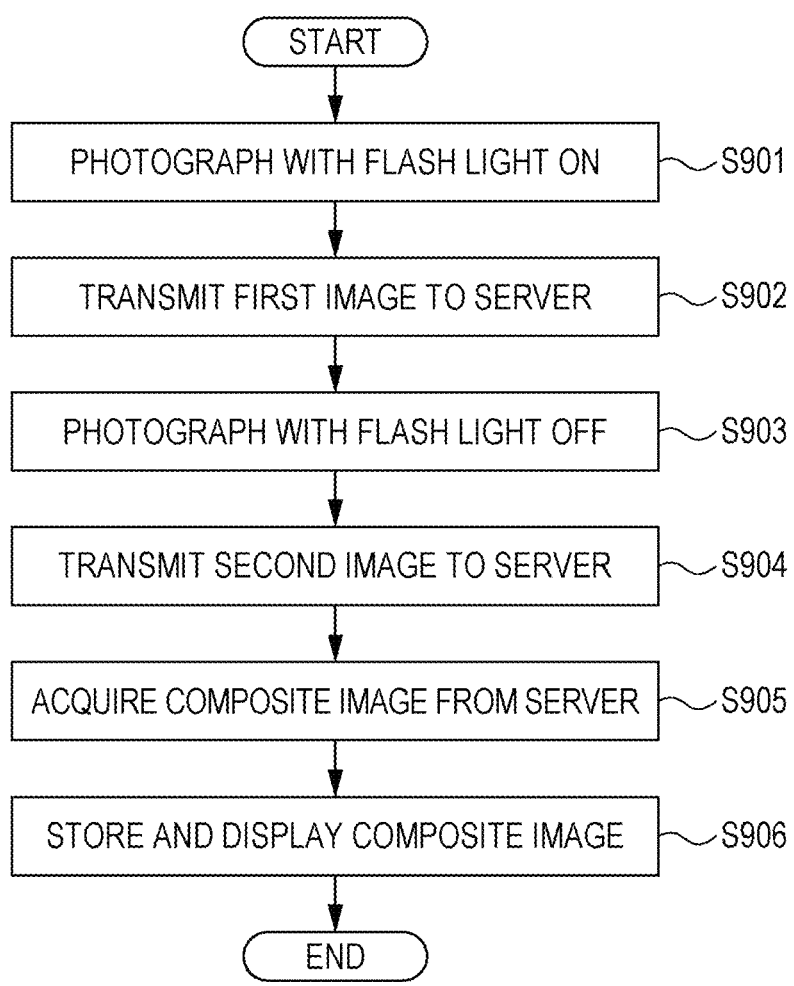
FIG. 12 is a flowchart illustrating the process of the terminal device of the modification of the exemplary embodiment.
Figure 13:
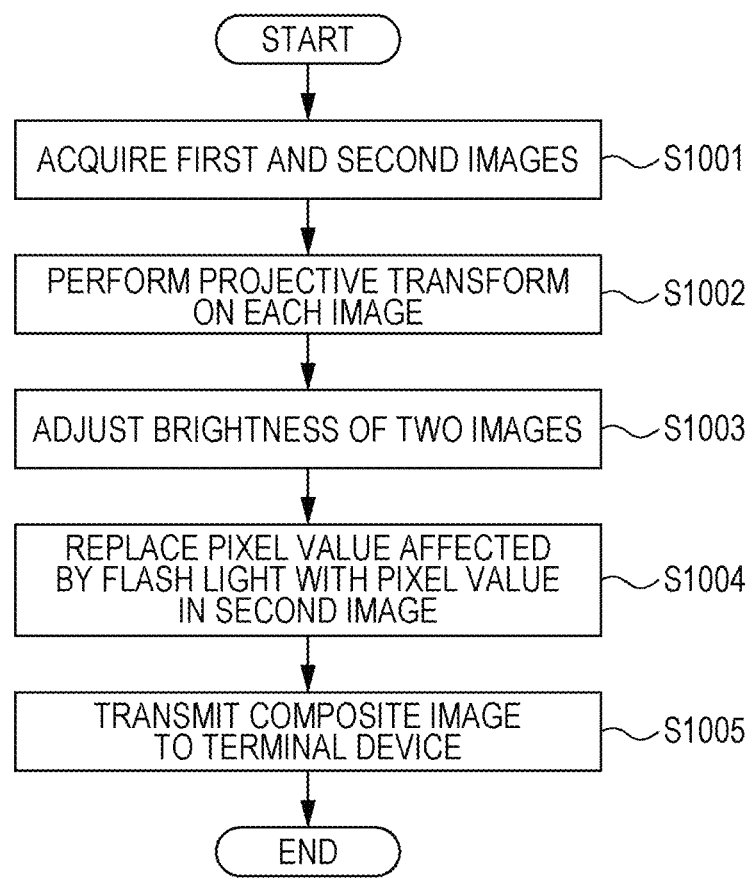
FIG. 13 is a flowchart illustrating the process of the image processing server of the modification of the exemplary embodiment.

Modification of the exemplary embodiment of the disclosure is described with reference to FIGS. 9 through 13. FIG. 9 illustrates the concept of an image processing system 60A of a modification of the exemplary embodiment of the disclosure. FIG. 10 is a functional block diagram illustrating a terminal device 20A of the modification. FIGS. 11A and 11B illustrate the configuration of an image processing server 80A of the image processing system 20A of the modification. FIG. 11A illustrates the hardware configuration of the image processing server 80A, and FIG. 11B is the functional block diagram of the image processing server 80A. FIG. 12 is a flowchart illustrating the process of the terminal device 20A of the modification. FIG. 13 is a flowchart illustrating the process of the image processing server 80A of the modification.

In the exemplary embodiment described with reference to FIG. 1 through FIG. 8, the photographing of the object 30 and the composing process of the images are performed by the single image processing apparatus 20. In the modification described with reference to FIG. 9 through FIG. 13, the photographing of the object 30 and the displaying of the composite image subsequent to image processing are performed on the terminal device 20A, and the image processing is performed on the image processing server 80A.

Referring to FIG. 9, the image processing system 60A of the modification includes the terminal device 20A and the image processing server 80A. The terminal device 20A and the image processing server 80A are respectively connected to a network 70A. In the modification, the terminal device 20A is generally identical in hardware configuration to the image processing apparatus 20 except that the terminal device 20A includes a communication interface (not illustrated). Elements identical to those in the image processing apparatus 20 are designated with the same reference symbols and the detailed discussion is omitted herein.

Referring to FIG. 10, a controlling microprocessor 201 in the terminal device 20A of the modification performs a control program stored on the storage device 203. The terminal device 20A thus has functionalities of a camera controller 211A, a display controller 212A, and an image transceiver unit 213A. The camera controller 211A and the display controller 212A are respectively identical in functionality to the camera controller 211 and the display controller 214 in the image processing apparatus 20 of the exemplary embodiment, and the detailed discussion thereof is omitted herein.

The first image is captured with the flash generating device 207 irradiating the object and the second image is captured with the flash generating device 207 not irradiating the object. The first image and the second image are stored on the memory 202 or the storage device 203. In response to an instruction input by the user operating the input interface 205, the image transceiver unit 213A transmits the first image and the second image to the image processing server 80A via the network 70A or receives the composite image produced on the image processing server 80A from the image processing server 80A via the network 70A.

Referring to FIG. 11A, the image processing server 80A of the modification includes a controlling processor 801A, a memory 802A, a storage device 803A, and a communication interface 804A, each thereof connected to a control bus 805A.

The controlling processor 801A controls the operation of each element in the image processing server 80A in accordance with the control program stored on the storage device 803A. The first image captured with the flash light radiating and the second image with the flash light not radiating are temporarily stored on the memory 802A. The storage device 803A includes a hard disk (HDD) and/or a solid-state drive (SDD), and stores the control program that controls each element in the image processing server 80A. The communication interface 804A controls communication that the image processing server 80A performs with the terminal device 20A via the network 70A.

Referring to FIG. 11B, the controlling processor 801A in the image processing server 80A executes the control program stored on the storage device 803A. The image processing server 80A has thus the functionalities of an image receiving unit 811A, an image generating unit 812A, and an image transmitting unit 813A.

The image receiving unit 811A receives from the terminal device 20A the first image captured with the flash light radiating and the second image with the flash light not radiating, and temporarily stores the first and second images on the memory 802A.

The image generating unit 812A adjusts the brightness of the whole second image such that the brightness at a specific location in the first image acquired by the image receiving unit 811A is approximately equal to the brightness at a corresponding specific location in the second image acquired by the image receiving unit 811A. The image generating unit 812A generates a composite image by replacing in the first image the pixel value of a pixel that is affected by the irradiation of the flash light with the pixel value of a pixel in the second image that is adjusted in brightness. The process described above remains unchanged from the process of the image generating unit 213 in the image processing apparatus 20 of the exemplary embodiment, and the detailed discussion thereof is omitted herein.

The image transmitting unit 813A transmits to the terminal device 20A the composite image generated by the image generating unit 812A via the communication interface 804A and the network 70A.

The process of the image processing system 60A of the modification is described below. The process of the terminal device 20A is described first with reference to FIG. 12. In step S901 of FIG. 12, the camera controller 211A causes the camera 206 to start operating in response to an instruction that is input by the user operating the terminal device 20A. The terminal device 20A photographs the object by causing the flash generating device 207 to irradiate the object with the flash light, and temporarily stores the captured image as the first image on the memory 202.

In step S902, the image transceiver unit 213A transmits the first image to the image processing server 80A via the network 70A.

In step S903, the camera controller 211 photographs the object with the flash generating device 207 not irradiating the object, and stores the captured image as the second image on the memory 202.

In step S904, the image transceiver unit 213A transmits the second image to the image processing server 80A via the network 70A. In the modification of the exemplary embodiment, the first image and the second image are transmitted to the image processing server 80A each time each of the first and second images is captured. Alternatively, the first and second images, after being captured, may be together transmitted to the image processing server 80A.

Referring to FIG. 13, the composing process of the images is performed on the image processing server 80A. In step S905, the image transceiver unit 213A receives the composite image from the image processing server 80A, and stores the composite image on the memory 202.

In step S906, the display controller 212A displays on the display 204 the composite image received in step S905 such that the user may view the composite image. The process thus ends.

The process of the image processing server 80A is described with reference to FIG. 13. In step S1001 of FIG. 13, the image receiving unit 811A in the image processing server 80A receives the first image and the second image from the terminal device 20A. The first image and the second image may be received together at the same time or separately with a time difference therebetween. The first image and the second image are temporarily stored on the memory 802A.

In step S1002, the image generating unit 812A projective-transforms each of the first and second images such that the two images are equal in size. The image size serving as a target of the projective transformation may be preset by the user, and the information on the image size may be received together with the first and second images. Alternatively, the terminal device 20A may be requested to specify the image size, and the user may specify the image size by operating the input interface 205 in the terminal device 20A. The information on the specified image size may be transmitted to the image processing server 80A.

In step S1003, the image generating unit 812A adjusts the brightness of the whole second image such that the brightness at a specific location in the first image projective-transformed is approximately equal to the brightness at a specific location in the second image projective-transformed. The operation is generally identical to the operation that the image generating unit 213 in the image processing apparatus 20 performs in step S407 of FIG. 6, and the detailed discussion thereof is omitted herein.

In step S1004, the image generating unit 812A generates a composite image by replacing in the first image projective-transformed the pixel value of a pixel that is affected by the irradiation of the flash light with the pixel value of a pixel in the second image that is adjusted in brightness in step S1003. The operation is generally identical to the operation that the image generating unit 213 in the image processing apparatus 20 of the exemplary embodiment performs in step S408 of FIG. 6, and the detailed discussion thereof is omitted herein.

In step S1005, the image transmitting unit 813A transmits the composite image generated in step S1004 to the terminal device 20A via the communication interface 804A and the network 70A. The process thus ends.

In the modification of the exemplary embodiment, the terminal device 20A captures the first image and the second image, and successively transmits the first image and the second image to generate the composite image. The disclosure is not limited to this method. The first image and the second image may be first stored on the storage device 203 in the terminal device 20A, and the image processing server 80A may later retrieve the first and second images, and generate the composite image.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising a processor configured to:
   receive a first image that is captured with an object irradiated with light from a light irradiating unit and a second image that is captured with the object not irradiated with light from the light irradiating unit wherein the first image and the second image are consecutively captured;
   adjust brightness of a whole area of the second image based on brightness of the first image to generate an adjusted second image, wherein a difference between brightness at a specific location in the first image and brightness at a corresponding specific location in the adjusted second image is within a predetermined range, and
   replace in the first image a pixel value of a pixel that has higher brightness than a pixel in the adjusted second image with a pixel value of the pixel in the adjusted second image to generate a composite image.

2. The image processing apparatus according to claim 1, wherein the processor generates the composite image by selecting the pixel value of the pixel in the first image or the pixel value of the pixel in the adjusted second image, whichever is lower in brightness.

3. The image processing apparatus according to claim 2, wherein the processor adjusts the brightness of the whole area of the second image such that a mean value of brightness at a plurality of specific locations in the first image is approximately equal to a mean value of brightness at a plurality of corresponding specific locations in the adjusted second image.

4. The image processing apparatus according to claim 3, wherein each of the specific locations in the first image is off a central region of the first image and each of the specific locations in the adjusted second image is off a central region of the adjusted second image.

5. The image processing apparatus according to claim 2, further comprising:
   an imaging unit that captures an image of the object; and
   the light irradiating unit that irradiates the object with light when the imaging unit captures the image of the object.

6. The image processing apparatus according to claim 1, wherein the processor generates the composite image by replacing in the first image a pixel value of a pixel in a target region to be replaced and a pixel value of a pixel in a region surrounding the target region with a value that is calculated using the pixel value of the pixel in the first image and the pixel value of the pixel in the adjusted second image.

7. The image processing apparatus according to claim 6, wherein the processor adjusts the brightness of the whole area of the second image such that a mean value of brightness at a plurality of specific locations in the first image is approximately equal to a mean value of brightness at a plurality of corresponding specific locations in the adjusted second image.

8. The image processing apparatus according to claim 7, wherein each of the specific locations in the first image is off a central region of the first image and each of the specific locations in the adjusted second image is off a central region of the adjusted second image.

9. The image processing apparatus according to claim 6, further comprising:
   an imaging unit that captures an image of the object; and
   the light irradiating unit that irradiates the object with light when the imaging unit captures the image of the object.

10. The image processing apparatus according to claim 1, wherein the processor adjusts the brightness of the whole area of the second image such that a mean value of brightness at a plurality of specific locations in the first image is approximately equal to a mean value of brightness at a plurality of corresponding specific locations in the adjusted second image.

11. The image processing apparatus according to claim 10, wherein each of the specific locations in the first image is off a central region of the first image and each of the specific locations in the adjusted second image is off a central region of the adjusted second image.

12. The image processing apparatus according to claim 1, wherein the processor adjusts the brightness of the whole area of the second image such that a mean value of brightness at a plurality of specific locations in the first image is approximately equal to a mean value of brightness at a plurality of corresponding specific locations in the adjusted second image.

13. The image processing apparatus according to claim 12, wherein each of the specific locations in the first image is off a central region of the first image and each of the specific locations in the adjusted second image is off a central region of the adjusted second image.

14. The image processing apparatus according to claim 1, further comprising:
   an imaging unit that captures an image of the object; and
   the light irradiating unit that irradiates the object with light when the imaging unit captures the image of the object.

15. The image processing apparatus according to claim 14, wherein the imaging unit captures the image with the object not irradiated with light from the light irradiating unit after the imaging unit captures the image with the object irradiated with light from the light irradiating unit.

16. The image processing apparatus according to claim 1, further comprising:
   an imaging unit that captures an image of the object; and
   the light irradiating unit that irradiates the object with light when the imaging unit captures the image of the object.

17. The image processing apparatus according to claim 16, wherein the imaging unit captures the image with the object not irradiated with light from the light irradiating unit after the imaging unit captures the image with the object irradiated with light from the light irradiating unit.

18. A non-transitory computer readable medium storing a program causing a computer to execute a process for processing an image, the process comprising:

receiving a first image that is captured with an object irradiated with light and a second image that is captured with the object not irradiated with light, wherein the first image and the second image are consecutively captured;

adjusting brightness of a whole area of the second image based on brightness of the first image to generate an adjusted second image, wherein a difference between brightness at a specific location in the first image and brightness at a corresponding specific location in the adjusted second image is within a predetermined range, and replacing in the first image a pixel value of a pixel that has higher brightness than a pixel in the adjusted second image with a pixel value of the pixel in the adjusted second image to generate a composite image.

19. A non-transitory computer readable medium storing a program causing a computer to execute a process for processing an image, the process comprising:

capturing a second image with an object not irradiated with light after a first image is captured with the object irradiated with light, wherein the first image and the second image are consecutively captured; and adjusting brightness of a whole area of the second image based on brightness of the first image to generate an adjusted second image, wherein a difference between brightness at a specific location in the first image and brightness at a corresponding specific location in the adjusted second image is within a predetermined range, and replacing in the first image a pixel value of a pixel that has higher brightness than a pixel in the adjusted second image with a pixel value of the pixel in the adjusted second image to generate a composite image.

* * * * *